March 18, 1958 G. WIGGERMANN 2,826,922
SWASH PLATES
Filed Jan. 11, 1954
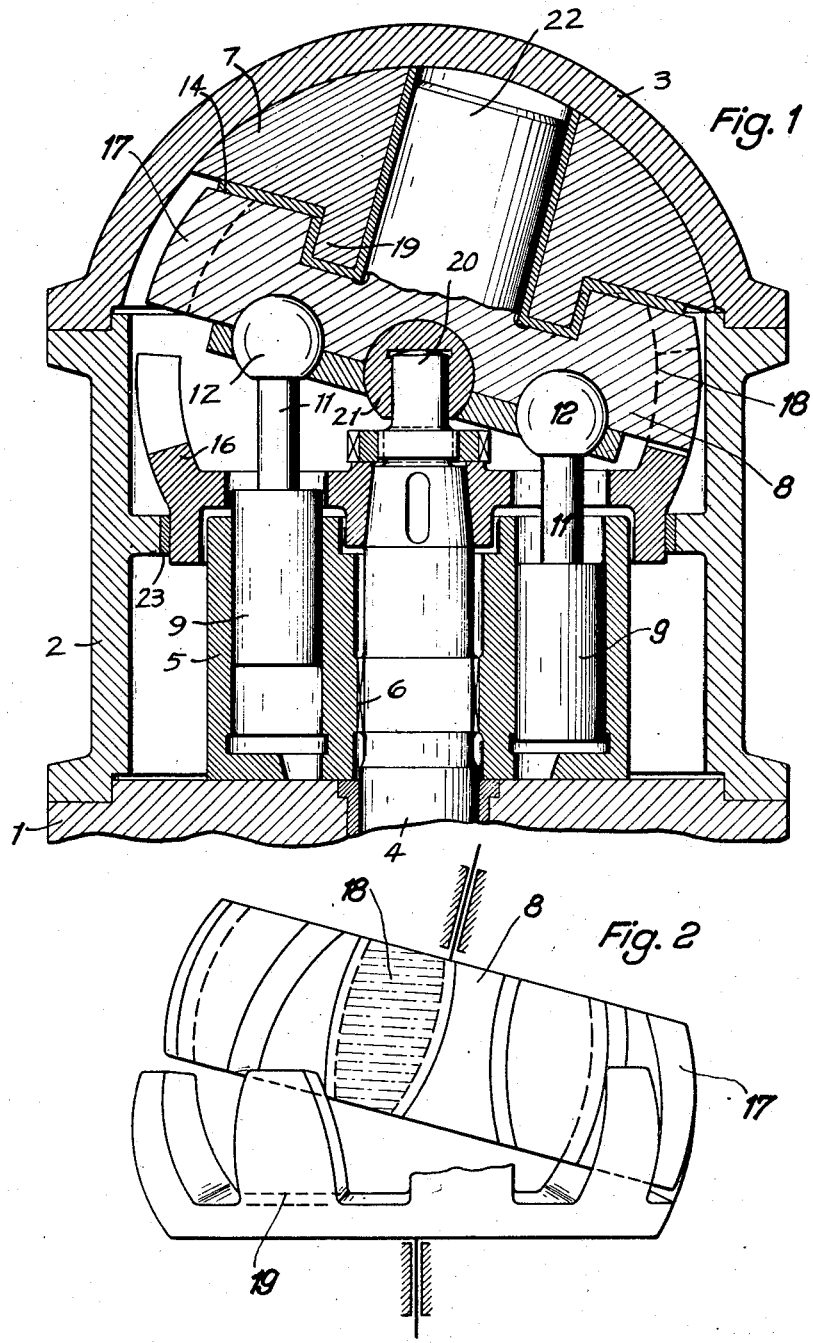
Inventor:
GEORG WIGGERMANN
BY:

United States Patent Office 2,826,922
Patented Mar. 18, 1958

2,826,922
SWASH PLATES

Georg Wiggermann, Kressborn, Boden See, Germany, assignor to Firma W. Schlafhorst & Co., M. Gladbach, Germany Application January 11, 1954, Serial No. 403,390

Claims priority, application Germany January 12, 1953

4 Claims. (Cl. 74—60)

This invention relates to swash plates for a swash plate pump or motor, for example for hydraulic transmissions, in which the swash plate has its axis inclined to that of a driving ring and is driven by it through interengaging gear teeth. Thus the driving ring may be mounted coaxially with a driving shaft and the cylinder body which receives the pistons.

An object of the invention is to provide an improved construction of such a swash plate.

According to the present invention the teeth of the swash plate are secured to the body of the swash plate by their end faces instead of or in addition to their root faces. The loading of such a toothed portion of a swash plate in relation to the forces to be transmitted is very high in a swash plate transmission, since the teeth cannot be broad. If, however, the teeth are connected to the body by the end faces in accordance with the invention the area of their connection can be greater than the area of the root by which such teeth have hitherto been secured. In this way it is found possible to make the teeth smaller for a given load.

Preferably the teeth are integral with the body of the swash plate, in which case a particularly strong bond exists between the swash plate body and the individual tooth. Moreover the gaps between the teeth may be open at the bottom. This simplifies the production of the toothed wheels, since the gaps can be machined right through between the teeth in a direction parallel or approximately parallel to the axis, with slight superimposed inclination in relation to the swash plate axis.

One specific embodiment of the invention will be described by way of example with reference to the accompanying drawings, in which:

Figure 1 is a longitudinal section through a hydraulic pump or motor, for either of which a swash plate in accordance with the invention is applicable, and Figure 2 is an elevation of the swash plate with the teeth in engagement with the teeth of the driving ring.

A base plate 1, an intermediate member 2 and a cover 3 together form a housing for the multi cylinder swash plate pump shown in the drawings. A cylinder drum 5 fittted on to a driving shaft 4 and connected to it through splines 6 receives pistons 9 operatively connected to a swash plate 8 through piston rods 11 and balls 12. A rocking bearing member 7 for a shaft 22 carrying the swash plate is adjustably guided in the cover 3. The swash plate 8 is driven from the driving shaft 4 through rings 16 and 17 of gear teeth. The toothed driving ring 16 is keyed to the end of the driving shaft 4 and supported in an annular flange 23 of the housing, while the toothed ring of teeth 17 is supported radially on an annular flange 19 of the rocking bearing member 7, and axially against its front face 14. The driving shaft 4 is also connected to the swash plate 8 through a ball joint; thus the forward end 20 of the driving shaft is a sliding fit in a bore formed in a ball 21 carried centrally by the swash plate 8.

In accordance with the invention the teeth 17 on the swash plate 8 are connected to the body of the plate 8, not in the usual way through their root faces, but through their end faces 18. Thus in Figure 2 the areas of the teeth by which they are secured to the body of the swash plate are shown in chain line hatching.

The position of the parts shown in Figure 2 corresponds to the maximum angular inclination to which the swash plate is adjustable. As the angular inclination is reduced the engaging teeth recede from one another but more and more teeth come into engagement, so that, when the axes of the swash plate and driving ring are in line all the teeth engage the companion teeth and form a normal claw coupling.

The arrangement of the teeth of the swash plate as described permits the transmission through the swash plate of heavy forces with a relatively light and compact construction. It further permits a simple process of manufacture to be employed for the formation of the teeth of the swash plate.

What I claim as my invention and desire to secure by Letters Patent is:

1. For use in a swash plate pump or motor, a swash plate having an outer peripheral side surface formed with a plurality of substantially axially extending grooves distributed about said peripheral side surface to form gear teeth at the outer periphery of said swash plate, each of said gear teeth having a width greater than its thickness, each of said grooves extending along the entire length of said plate and having open ends so that said gear teeth are separate and spaced from each other.

2. For use in a swash plate pump or motor, a solid swash plate having a pair of substantially parallel end faces and an outer peripheral side surface, said side surface being formed with a plurality of grooves extending between said end faces in substantially axial direction and being distributed about said peripheral side surface to form gear teeth at the outer periphery of said swash plate, each of said gear teeth having a width greater than its thickness.

3. For use in a swash plate pump or motor, a solid swash plate having a pair of substantially parallel end faces and an outer peripheral side surface forming part of a sphere, said side surface being formed with a plurality of grooves extending between said end faces in substantially axial direction, said grooves having bottom faces concentric with said spherical side surface and being distributed about said peripheral side surface to form gear teeth at the outer periphery of said swash plate, each of said gear teeth having a width greater than its thickness.

4. In a swash plate pump or motor, in combination, a swash plate; support means supporting said swash plate for rotation about a given axis; first gear means fixed to said swash plate and including gear teeth integral with said swash plate and projecting radially from the peripheral side surface thereof, said gear teeth having a width greater than their thickness and being entirely spaced from each other; and second gear means mounted for rotation about an axis inclined to said given axis, said second gear means including teeth having respectively flange faces of substantially identical shape and spacing than said first gear means and said first and second gear means interengaging with each other.

References Cited in the file of this patent

UNITED STATES PATENTS

| 672,263 | Dean | Apr. 16, 1901 |
| 1,277,491 | Scott | Sept. 3, 1918 |
| 1,456,690 | Goldberger | May 29, 1923 |

FOREIGN PATENTS

| 881,100 | France | Jan. 15, 1942 |